INVENTOR.
Donald C. Schluderberg
BY
ATTORNEY

INVENTOR.
Donald C. Schluderberg
BY
ATTORNEY

April 19, 1966 D. C. SCHLUDERBERG 3,247,073
MULTI-PASS, VAPOR MODERATED AND COOLED NUCLEAR REACTOR AND
METHOD OF OPERATING TO VARIABLY MODERATE AND CONTROL SAME
Filed May 23, 1962 5 Sheets-Sheet 3

*INVENTOR.*
Donald C. Schluderberg
BY
*ATTORNEY*

April 19, 1966 D. C. SCHLUDERBERG 3,247,073
MULTI-PASS, VAPOR MODERATED AND COOLED NUCLEAR REACTOR AND
METHOD OF OPERATING TO VARIABLY MODERATE AND CONTROL SAME
Filed May 23, 1962 5 Sheets-Sheet 4
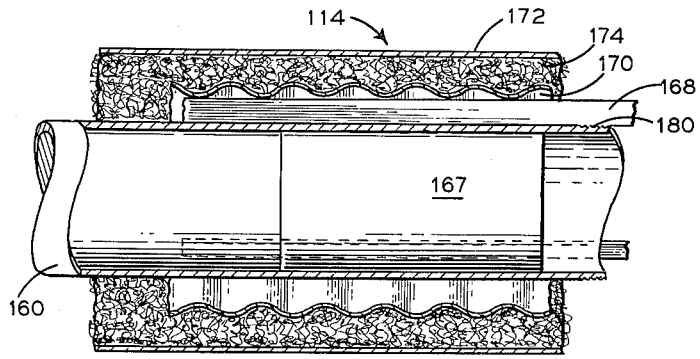
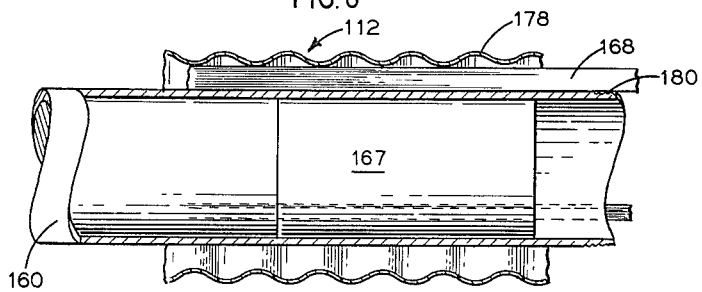
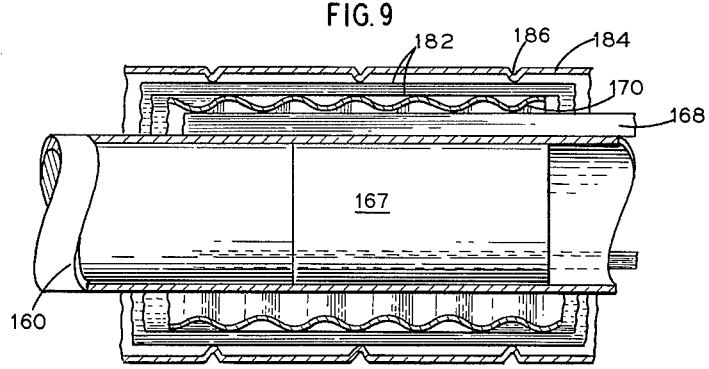
*INVENTOR.*
Donald C. Schluderberg
BY
ATTORNEY INVENTOR.
Donald C. Schluderberg
BY
ATTORNEY United States Patent Office 3,247,073
Patented Apr. 19, 1966

3,247,073
MULTI-PASS, VAPOR MODERATED AND COOLED NUCLEAR REACTOR AND METHOD OF OPERATING TO VARIABLY MODERATE AND CONTROL SAME
Donald C. Schluderberg, Lynchburg, Va., assignor to The Babcock & Wilcox Company, New York, N.Y., a corporation of New Jersey
Filed May 23, 1962, Ser. No. 197,060
12 Claims. (Cl. 176—42)

The present invention relates in general to a nuclear reactor and, more particularly, to a method of operating such a reactor wherein a hydrogen-bearing vapor is used to variably moderate, control and cool the chain reaction.

In every nuclear reactor a quantity of fissionable material must be arranged as a core with sufficient mass and proper configuration to establish and sustain a fission-type chain reaction. Further, in non-breeder types of reactors it is necessary to provide fissionable material in the core in excess of that necessary merely to establsh the chain reaction in order to sustain the reaction for a practical length of time. Such excess fuel is necessary to compensate for the fissionable material which is consumed throughout the life of the reactor and to overcome the effect of the accumulation of neutron absorbing poison materials generated by the fission process. As a result of the inclusion of this excess fuel within the core, more neutrons are produced at any given instant than are necessary to maintain the self-sustaining fission-type chain reaction. Accordingly, it is necessary to control this excess number of neutrons either by capturing them nonproductively, allowing them to escape from the reactor, or by capturing them in fertile nuclear material so as to generate or breed additional nuclear fuel.

In reactors of the prior art, nonproductive absorption of excess neutrons has been achieved by introducing into the reactor core neutron poison material, i.e., a material which absorbs neutrons. Neutron poison materials, such as hafnium or boron, have been introduced into reactors in the form of movable control rods or, less frequently, introducted in the form of poison material either built permanently into the structural material of the reactor core or in a soluble form mixed with the reactor coolant and circulated through the core. The use of such control rods within a reactor necessitates utilization of intricate mechanical equipment to control and regulate their movement into and out of the reactor core. These control rods increase the cost and complexity of the reactor due to this intricate nature. Furthermore, the utilization of such movable control rods within a reactor core creates the undesirable effect of flux peaking in the core which is due, in part, to the fact that the poison material of the control rod is movably positioned within the core in the path of the neutrons generated by the chain reaction thereby resulting in peaks of temperature and heat flux within the core. Inasmuch as the maximum surface temperature of fuel elements in the core must be calculated with due consideration directed to this peaking, reactors are necessarily designed with lower average surface temperature and/or heat flux throughout the core than would otherwise be possible, since it is necessary to maintain the maximum possible fuel clad surface temperature within safe use limits.

As is well known in the art, the process of fissioning nuclear fuel atoms to produce a chain reaction generates neutrons having a wide range of high velocities. It is also known that, generally the chain reaction is best promoted by slower or thermal neutrons rather than by the fast neutrons generated by the fissioning of an atom. This results from the fact that thermal neutrons have a greater probability of fissioning new atoms than do the fast neutrons which tend to completely escape from the reactor core. It is thus necessary to moderate or slow the neutrons generated by the chain reaction so as to increase the number of thermal neutrons available to further promote and sustain the chain reaction. In reactors of the prior art, this moderation is accomplished by the use of such materials as graphite, beryllium oxide, heavy or ordinary water distributed throughout the core.

In these prior art reactors it has been necessary to use separate and distinct systems or apparatus to moderate the neutrons created by the chain reaction and to control the chain reaction. This has been necessary since it has not previously been possible to both moderate and satisfactorily control the reactor utilizing the same apparatus. Control rods have been especially necessary in order to insure a safe, reliable method of starting, operating and shutting down the reactor. It is recognized that if a safe dependable method of supplying such control could be accomplished without the use of control rods, the flux peaking discussed above could be minimized, thereby making possible the utilization of a higher average core temperature with consequent increase in the final temperature of the cooling medium or an increase in power output for the same final temperature, both resulting in improved cycle efficiencies.

Copending application Serial No. 158,022 filed December 8, 1961, in which applicant is a coinventor discloses a means both to variably control and moderate a nuclear reactor to produce a self-sustaining chain reaction by introducing a hydrogen-bearing moderating vapor into the core and regulating the reaction by varying the concentration of the hydrogen constituent in the core. This is accomplished, as disclosed, either by varying the concentration of the hydrogen within the moderating vapor or by varying the density of the moderating vapor within the reactor core with a resultant variation in the concentration of hydrogen therein. In the method disclosed in this copending application it is necessary, in order to achieve operating stability, to utilize separate circuits for the cooling fluid and for the moderating vapor. At that time, it was not known how to achieve the negative temperature coefficient of reactivity necessary to attain adequate reactor and system stability when utilizing a single fluid for both the coolant and the moderating vapor. It has been found in the present invention that such utilization of a single fluid both for cooling and for moderating a reactor is possible if thermal feedback is introduced into the cooling and moderating vapor. The thermal feedback provides the reactor with a negative temperature coefficient of reactivity so that upon slight disturbances in reactivity the reactor is self-compensating. Additionally, with the utilization of such thermal feedback it is found that the reactor can be made self-regulating, so that upon changes in system output calling for a change in reactivity, the reactor will automatically seek the new power output level.

Accordingly, the present invention discloses a method for variably controlling, moderating and cooling a nuclear reactor having a multiplicity of fissionable material-bearing fuel elements arranged as a core to undergo a self-sustaining fission-type chain reaction comprising the steps of introducing a hydrogen-bearing moderating and cooling vapor into said core and regulating the fission-type chain reaction by varying the concentration of hydrogen in said core.

Additionally, the concentration of hydrogen in the core may be varied by either varying the concentration of hydrogen in the vapor and/or by varying the density of the vapor within the core.

Furthermore, the method comprises the step of introducing the hydrogen-bearing moderating and cooling vapor into a first group of fuel elements within the core whereby the vapor is heated to a moderating density, then passing the vapor at the moderating density about all of the fuel elements in the core to moderate the chain reaction, and then passing the vapor through a second group of fuel elements to be further heated.

In addition, the present invention relates to a nuclear reactor comprising a pressure vessel containing a plurality of fissionable material-bearing fuel elements arranged therein to undergo a self-sustaining fission-type chain reaction, the fuel elements comprising a first group and a second group whereby the first group is serially connected in a fluid flow sense between an inlet to the pressure vessel and a moderating space arranged around both the first and the second groups of fuel elements and the second group of fuel elements is serially connected between the moderating space and the pressure vessel outlet, the first group of fuel elements being suspended within shroud tubes arranged to separate the fuel elements from the moderating space and supported from the upper portion of the pressure vessel and terminating in the lower portion of the moderating space, and the second group of fuel elements being suspended in a second group of shroud tubes which are supported from the lower portion of the pressure vessel and which terminate in the upper portion of the moderating space.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which the preferred embodiments of the invention have been illustrated and described.

Of the drawings:

FIG. 7 is an enlarged cross-sectional view of a portion of the fuel element within a third pass shroud tube;

FIG. 8 is an enlarged cross-sectional view of a portion of a fuel element within a first pass shroud tube;

FIG. 9 is an enlarged cross-sectional view of a portion of a fuel element in an alternate type third pass shroud tube;

The specific reactor arrangement illustrated in FIGS. 2 to 9 forms the invention claimed in the copending joint application of J. W. Ryon and D. C. Schluderberg, Serial No. 197,082, filed May 23, 1962.

Figure 1:
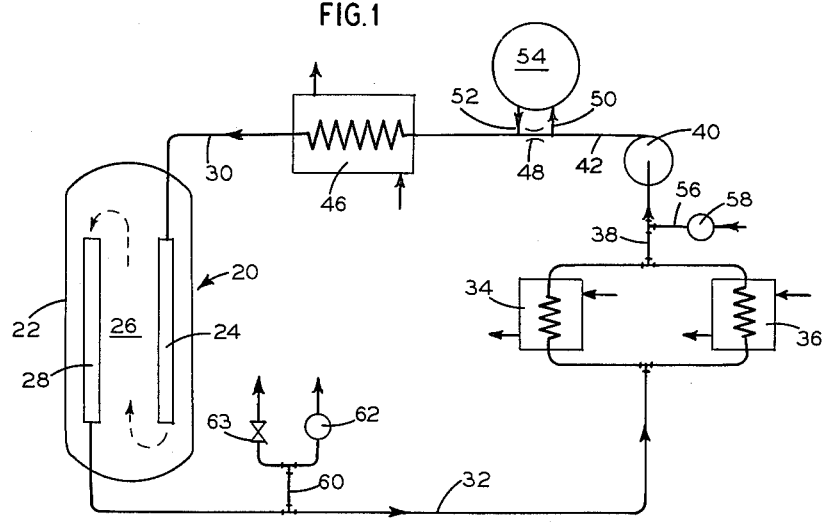
FIG. 1 is a schematic illustration of the reactor system of the present invention.

A schematic illustration of a reactor system of the present invention is presented in FIGURE 1 wherein a reactor 20 is provided with a suitable pressure retaining vessel 22, the interior of which is divided into three separate and distinct passes. These passes include a first pass 24 through a portion of the reactor, a second or moderating pass 26, and a third pass 28 through the remaining portion of the reactor as will be more fully described. Fissionable material-bearing fuel elements, of a type well known in the art, are arranged within the reactor pressure vessel 22 to form a core with a critical mass to undergo a self-sustaining fission-type chain reaction when moderated, as will be described. A portion of the fuel elements are disposed within the core of the reactor in the first pass 24, and the remaining portion are disposed in the third pass 28 of the core. These passes are arranged so that a fluid which is both moderator and coolant, supplied to the reactor through an inlet line 30, flows through the first pass 24, cooling the fuel elements therein by absorbing heat therefrom. After being heated in the first pass the coolant fluid then flows through the second, or moderating pass or space 26 which encompasses the exterior of the fuel elements in both the first and third passes. In passing through the moderating space the moderating and coolant fluid moderates the neutrons therepresent continuing the chain reaction as will be further described hereinbelow. After passing through the moderating space 26 the moderating and cooling fluid passes through the third pass 28, cooling the fuel elements disposed therein, being heated by direct heat transfer to a predetermined outlet temperature. As illustrated schematically in FIGURE 1, the first and third passes 24 and 28, respectively, within the reactor pressure vessel may be comprised of a plurality of tubes disposed within the reactor with the first pass tubes being connected with the inlet line 30 and opening at their opposite end to the moderating space 26, while the third pass tubes connect directly with the outlet line 32 and open at their opposite ends to the opposite end of the moderating space 26 from that in communication with the open end of the first pass 24. In this way the coolant-moderator enters the reactor 20 through inlet line 30, passes downwardly through the first pass 24 and enters the lower end of the moderating space 26. The coolant-moderator then passes upwardly through the moderating space 26 around both the first and third pass tubes and enters the upper end of the third pass 28, flowing downwardly therethrough and out of the reactor by outlet line 32.

The heated moderator-coolant fluid then passes through heat exchangers 34 and 36 giving up heat to a secondary heat transfer fluid in an indirect heat transfer relation, the latter fluid being transported to a point of use, not shown. These heat exchangers may operate in series or in parallel for imparting heat to the secondary fluid or one may serve as a superheater 34 and the other as a reheater 36 for the secondary heat transfer fluid system in a manner well known in the art. Upon leaving these heat exchangers 34 and 36 the moderator-coolant fluid enters the inlet of pump 40 which discharges the fluid through line 42 to heat exchanger 46 which acts as a boiler or steam generator for the secondary fluid. Upon leaving heat exchanger 46 the coolant-moderator fluid returns to the reactor via inlet line 30.

An orifice 48 is positioned in the pump outlet line 42 to produce a slight pressure drop in the moderator-coolant fluid flowing therethrough. On either side of this orifice 48, a connection is made by lines 50 and 52 to a surge chamber 54, whose purpose will be further described hereinbelow.

A moderator-coolant fluid supply line 56 is provided in the reactor system. It is equipped with a metering device 58 and opens into the line 38 entering pump 40. An exhaust line 60 having a metering device 62 and a relief valve 63 is also provided and is in communication with the outlet line 32. The metering devices 58 and 62 may be of any type well known in the art and may include metering valves or positive displacement pumps, the primary requirement of each being that they be capable of transferring accurate, predetermined amounts of coolant-moderator fluid into or out of the reactor circuit, as necessary, to permit a closely controlled variation of the concentration or inventory of the moderator-coolant fluid within the reactor circuit. Relief valve 63 may be either automatic or selectively operable as conditions dictate to vent fluid from the reactor circuit to a lower pressure receiver (not shown), thus enabling the pressure within the reactor circuit to be quickly reduced and thereby decreasing the concentration or inventory of the moderator-coolant fluid within the reactor in order to terminate the chain reaction.

The moderator-coolant fluid may be any hydrogen-bearing vapor including, but not limited to, vaporous hydrocarbons, pure hydrogen gas, steam or mixtures of any of these with inert gases. For reasons later discussed the preferred moderator-coolant fluid and the one which will be discussed to a greater extent hereinbelow is steam provided at supercritical pressures.

Figure 10:
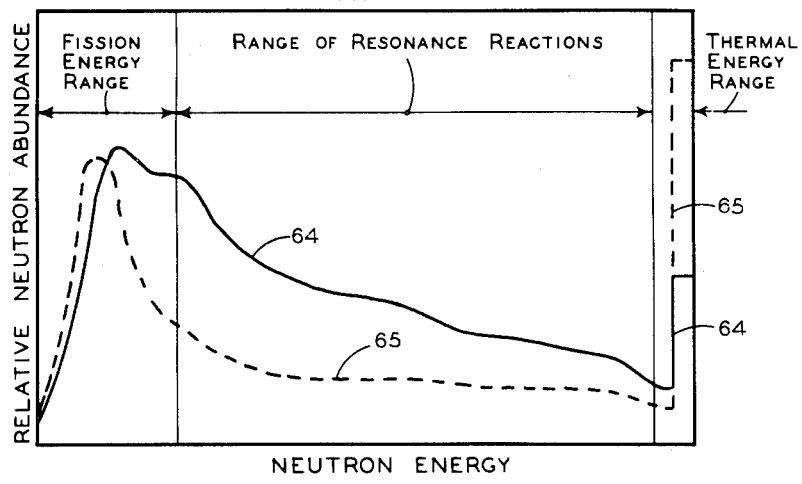
FIG. 10 is a graphical representation of neutron abundance versus neutron energy.

It is known that in a nuclear reactor, when the fuel material undergoes fissioning, neutrons having a wide range of energies are generated. As shown in FIGURE 10, there is a comparatively wide variation in the relative abundance in neutrons produced with respect to the energies involved. Neutrons generated by the fissioning of an atom have a high energy level and as they move outwardly from the atom being fissioned they are moderated or slowed by the various materials within the reactor, including both the structural as well as the moderating material. As these neutrons are slowed they pass through a resonance reaction energy range, wherein fertile material may capture the neutrons and thus create additional fissionable material out of fertile material, as is well known in the art. At lower neutron energies, i.e. below the resonance reaction range, is the thermal energy range wherein most fissionable material reacts with the neutrons therepresent to undergo a fission reaction. It has been found that the relative abundance of neutrons within the range of resonance reactions and within the thermal energy range may be altered by varying the amount of moderation to which neutrons are subjected. Thus, if the neutrons are subjected to a comparatively great amount of moderation, the relative abundance of neutrons within the various energy ranges will approximate that shown by line trace 65 in FIGURE 10. As may be seen, the neutron abundance within the thermal energy range is relatively high, while that within the resonance reaction range is relatively low. Conversely, should the amount of moderation be relatively low, the abundance of neutrons within the various energy ranges will approximate that indicated by trace line 64. Accordingly, during initial operation of a reactor, while the amount of fuel material in the core is relatively high and the amount of neutron poisons contained therein is relatively low, the chain reaction may be sustained with less neutron moderation since fewer neutrons are necessary in the thermal energy range. After prolonged periods of operation, however, the amount of fuel within the core will have substantially decreased with a corresponding rise in fission product neutron poison content within the core. In this situation more neutron moderation is required since more neutrons are necessary within the thermal energy range to sustain the fission-type chain reaction. As a result, the relative number of neutrons available within the range of resonance reactions to react with the fertile material within the core, is reduced.

Thus it may be seen that the efficiency of neutron utilization within a reactor may be enhanced throughout the life of the core by the combined use of a fertile nuclear material with the fissionable nuclear material in the reactor core in combination with the control of neutron moderation. This economy is made more apparent when it is realized that if such fertile material were not utilized in a reactor core, the amount of neutrons made available for the fissioning of the reactor fuel, i.e. in the thermal energy range, would be regulated only by changing the number of neutrons absorbed nonproductively by control poisons within the core, or by varying the number of neutrons permitted to escape from the periphery of the core. In either case utilization of the neutrons generated by the chain reaction would be less than optimal and the over-all efficiency less than the maximum attainable when using the teachings of this invention.

It has been found that a reactor of the present invention may be operated and its output controlled by the utilization of a hydrogen-bearing vapor. While gases, for example pure hydrogen, could be used as the moderator-coolant of the present invention, the pressure required to attain the requisite density within the reactor core to provide sufficient moderation for sustaining a chain reaction would exceed practicable structural limitations. Furthermore, the use of pure hydrogen would not provide the desired heat transfer characteristics to permit the construction of an efficient power producing reactor. It has been found, however, that high pressure, high temperature steam meets the prerequisites for a hydrogen-bearing moderator-coolant. Steam having a temperature in the order of 700° F. and a pressure of approximately 3400 p.s.i., will provide a sufficient concentration of hydrogen within the reactor core to satisfactorily sustain a chain reaction, while providing the desired heat transfer and transport characteristics. By varying the density of the steam within the reactor core, by changing its temperature, its pressure, or by diluting the steam with a nonmoderating vapor, or by any combination of these, the moderation of the chain reaction, and thus the reactivity of a reactor, may be controllably varied. Accordingly, the effective variable moderation of the reactor as discussed above with respect to FIGURE 10 is possible using this method of moderation.

As noted above, in reactors of the prior art control rods have been necessary in order to provide safety shutdown control of a reactor. This safety shutdown control for a nuclear reactor of the present invention is provided by the relief valve 63 discussed above. Inasmuch as a reactor will not operate unless there is sufficient moderation to permit continuance of the chain reaction, if the concentration of the moderator-coolant within the reactor is suddenly decreased, the reactor will quickly become subcritical and shut itself down. Such a decrease in concentration of moderator-coolant within the reactor is achieved by the opening of the relief valve 63 which vents the reactor fluid to a lower pressure receiver (not shown). This mode of operation is possible with a reactor of the present invention due to the fact that the moderator-coolant fluid is in a vaporous state and so is characterized by significant changes in density for comparatively small changes in pressure. Where the moderator-coolant is a liquid, as for example pressurized water, the change in pressure achieved by opening a relief valve would not produce sufficient change in the moderator density to provide effective control since water in the liquid state is nearly incompressible. Neither is such control possible in boiling water reactors, since the change in pressure effected by venting would not decrease the density of the moderating fluid but would only flash to steam a portion of the boiling liquid therepresent, leaving the remaining liquid in the core to moderate the chain reaction.

In initiating operation of a reactor of the present invention the reactor system is first brought to an equilibrium operating temperature by circulating a small amount of steam therethrough while continuously supplying heat to it from an external heat source (not shown). When the reactor system has reached initial operating temperature, additional steam is introduced into the circuit through the inlet metering device 58 by way of inlet line 56 thereby increasing the density of the vapor within the reactor core, with the neutron moderation increasing to the point where reactor criticality is reached and a self-sustaining fission-type chain reaction is initiated. The reactor power is then raised slowly to a point where the external heat source is no longer required. These and subsequent power increases are achieved by introducing additional vapor into the system and/or by increasing the hydrogen atom concentration of the vapor.

The heat exchangers 34, 36 and 46 in the reactor system in the meantime commence their functioning, the primary or moderator-coolant fluid giving up heat produced within the reactor to a secondary fluid for the conversion to useful work, as for example power, or for some other useful end result.

Figure 11:
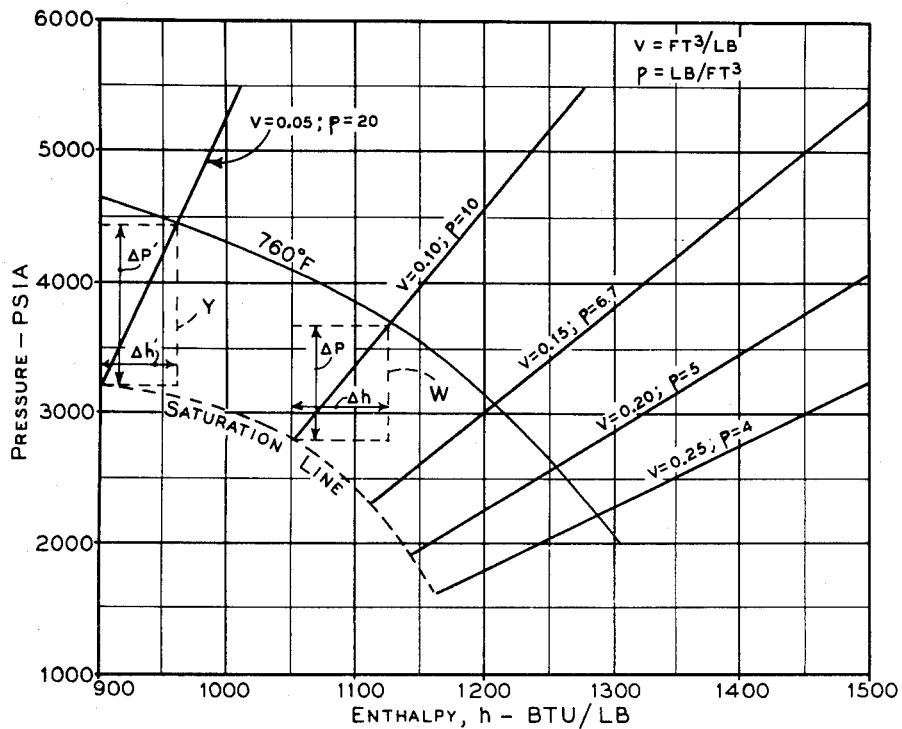
FIG. 11 is a graphical representation of steam density corresponding to various pressures and enthalpies.

Referring to FIG. 11 it may be seen that for a reactor, which is a substantially constant volume system, requiring a density $\rho$ of moderating steam of approximately 10 pounds per cubic foot and operating within a temperature range between its saturation temperature and 760° F., the moderator-coolant pressure falls within a range of pressures, $\Delta P$, which extends from about 2800 p.s.i.a. to 3700 p.s.i.a. provided the enthalpies are maintained within a corresponding range of $\Delta h$'s from about 1050 B.t.u./lb. to 1125 B.t.u./lb. The relationships for these conditions are indicated generally by reference letter W. As the reactor ages, the amount of moderation necessary to sustain the chain reaction increases and the mass of the moderating vapor in the loop would be increased so that the density of the vapor at the end of core life would be approximately 20 pounds per cubic foot. At that time the moderator-coolant vapor, while being maintained within the same temperature range as before, would be operated over a range of pressures $\Delta P'$, of 3200 p.s.i.a. to 4450 p.s.i.a. with a corresponding range of enthalpies $\Delta h'$ of 900 B.t.u./lb. to 960 B.t.u./lb.; as indicated by reference letter Y. While these values have been given in the way of examples, it will be appreciated that the density of steam or other moderator-coolant fluid will be dictated by the particular design of the reactor in question. However, it should be noted that the permissible upper temperature limit of the moderator-coolant vapor in the moderator space 26 will be approximately 760° F. depending upon the amount of heat that will be transferred to the moderator-coolant vapor by the fuel elements in the third pass and by the final outlet temperature desired. Such final outlet temperature would, of course, be determined by the temperature limitations of the structural material of the various system components. The lower temperature limit has been indicated as saturation due to the requirement that vapor only be contained within the reactor circuit. However, the lower limit of the moderator-coolant vapor may be dictated by the desire to maintain the moderator-coolant within the reactor in the supercritical pressure range, since when operating at approximately 3500 p.s.i.a. steam in the temperature range of from 690° F. to 1050° F. can absorb 700 B.t.u./lb. available for transference in the heat exchanger as contrasted to the 400 B.t.u./lb. heat transfer capacity of steam when operating at only 2800 p.s.i.a. As a result of this increased heat transfer capacity per pound of steam, each of the system components can be made smaller in size for a corresponding power output.

When it is desired to operate with the moderator-coolant vapor in the supercritical range throughout the life of the reactor, it may become necessary, in order to achieve satisfactory service life of the nuclear fuel elements, to mix the moderator-coolant vapor with a compatible vapor having little or no moderating effect upon the chain reaction. Such a diluting vapor or gas could be any substance which is compatible with the moderator-coolant vapor and produces the desired thermodynamic effects, as for example, heavy water, $D_2O$, which has a moderating effect considerably less than that of ordinary water. By dilution of the moderator-coolant vapor satisfactory service life of the nuclear fuel elements can be achieved by varying the system pressure between 3600 p.s.i.a. and 3900 p.s.i.a., thus staying within the supercritical range. However, should the density of the moderator-coolant be varied throughout the life of the core by varying the pressure and temperature only and not by dilution as set forth above, it would be necessary to use a wider range of pressures, for instance between 2800 p.s.i.a. and 3900 p.s.i.a., in order to attain satisfactory life from the fuel elements, thereby reducing the heat transport capacity of the moderator-coolant steam as set forth above. Additional benefits are derived from maintaining the moderator-coolant steam in the supercritical pressure range in that the heat transfer characteristics of steam in the temperature range encountered within the first pass fuel element is almost the same as for water. Accordingly, the structural material in the first pass fuel elements can be maintained at a temperature low enough to use material having a low neutron absorption cross section, thereby reducing the amount of neutron absorbing stainless steel required in the core.

In a nuclear reactor it is desirable to provide a negative temperature coefficient of reactivity dependent upon the temperature of the moderator-coolant so the reactor will tend to be self-regulating, adjusting the reactivity level to the power output demand of the system and minimizing reactivity surges generated within the reactor itself. Keeping in mind the fact that the reactor circuit is a substantially contant volume system, as the output demand of the system increases, reducing the temperature of the steam returning to the reactor by inlet line 30, the moderator-coolant vapor will have a higher density entering the reactor resulting in greater neutron moderation and an increase in the power output of the reactor. Conversely, should the output demand of the system decrease, the moderator-coolant steam temperature entering the reactor will be raised, since the heat exchangers are rejecting some available heat, thereby decreasing its density and its moderating effect and reducing the power output in the reactor to the point where equilibrium is again reached at the lower system power output.

In determining the amount of moderation provided by the moderator-coolant vapor within the reactor, the combined, weighted average of the vapor densities in the first, second and third passes of the core must be found in order to ascertain the amount of moderation being supplied to the reactor core at any given instant. For example, if the volume fractions of moderator-coolant steam spaces within the reactor is apportioned among the three passes according to the ratio of 10.6:77.0:12.4 in the first, second and third passes, respectively, to provide the requisite neutron moderation and the average temperature of each is determined, the total amount of moderation atoms may be calculated. In the initial design of this reactor the proportion of moderation to be provided in the moderating pass is determined and the corresponding temperature and pressure requirements are established, the steam conditions in the first and third pass then being developed therefrom.

In order to attain a negative temperature coefficient of reactivity in a reactor of the type herein disclosed, it is necessary that variations in the reactivity level of the reactor provide self-compensating feedback characteristics. This feedback is provided in the reactor of the present invention by utilizing the very disturbances in the reactivity which it is desired to correct to vary the moderating capabilities of the moderator-coolant vapor. The more feedback so achieved, the more stable the reactor will be. Ideally, the steam leaving the reactor outlet would be used as the moderator-coolant vapor since any variation in the reactivity level of the reactor would be transmitted to the temperature, pressure conditions of the outlet steam. However, steam at the outlet temperature and pressure of this reactor is not dense enough to provide satisfactory moderation. Accordingly, some compromise of the ideal must be achieved in order to attain moderator-coolant densities sufficient to meet the neutron moderation requirements of the reactor. This is accomplished in the reactor of the present invention by the three-pass design described above. Accordingly, the steam entering the first pass of the reactor provides a portion of the neutron moderation, as illustrated above, while at the same time responding to reactivity levels within the reactor which would change the reactivity of the fuel elements in the first pass and thus the heat produced therein. This variation in the heat generated in the first pass is transmitted to the moderator-coolant flowing therethrough and changes the characteristics of the steam entering the second moderating pass wherein the major portion of the reactor moderation occurs. Accordingly, if some disturbance within the reactor causes the reactivity to increase, the power produced in all the fuel elements, including those of the first pass would increase and raise the temperature of the moderator-coolant vapor leaving the first pass. While this increase in temperature of the moderator-coolant vapor in the first pass affects the reactivity of the reactor to some extent, it may not sufficiently affect the reactivity of the entire reactor to counteract the disturbance mentioned above. However, due to the fact that the major portion of the moderation of the reactor occurs in the moderating pass, the increased temperature of the moderator-coolant vapor entering the moderator pass is reflected in the reactivity level of the reactor and the reactor tends to return to the prior stable conditions by changing the moderator density in the moderating pass. In the above it was assumed that an increase in the temperature and enthalpy of the steam in the reactor would produce a decrease in the density of this steam in spite of a rise in system pressures. To achieve this effect it is necessary that system piping and component volumes, including the surge chamber 54 and the rate of by-pass flow through it, are in correct proportion to the reactor steam space volume and reactor thermal feedback. The converse would be true, of course, should the reactivity of the reactor decrease with consequent change in moderator-coolant vapor density. In this case the temperature of the coolant would tend to drop, returning the reactivity to the previous level. The amount of feedback in a reactor of the present invention is a function of the volumetric ratio of the various passes in the reactor core. Accordingly, if 25% feedback is satisfactory for maintaining stable reactor operating conditions with the design here disclosed, one fourth of the total number of fuel elements would be positioned in the first pass, with the remaining three-fourths of the fuel elements being located in the third pass. Should other feedback ratios be desired they could easily be achieved by proportioning the distribution of fuel elements between the first and third passes, keeping in mind the vapor density required in the moderating space in order to satisfactorily moderate the chain reaction.

The surge chamber 54 in FIG. 1 which is connected via lines 50 and 52 across orifice 48 in the pump outlet line 42 is intended to compensate for system disturbances and thus assure reactor stability. In operation the surge chamber 54, in combination with the orifice 48, operates as a buffer for pressure and enthalpy surges occurring in the reactor system induced by causes other than the reactor itself. The degree to which enthalpy surges are damped is controlled by the amount of steam passed through the surge chamber which, in turn, is determined by the orifice size. Such a surge might occur in the reactor system if the system load were suddenly dropped with a resulting increase in the temperature of the moderator-coolant vapor. While an increase in temperature would not ordinarily affect the reactivity of the reactor, inasmuch as there would generally be a corresponding rise in pressure which would maintain the density of the moderator-coolant vapor substantially constant with a resulting constant level of reactivity, a sudden rise in temperature in a portion of the reactor system remote from the reactor could unbalance the reactivity of the reactor. This is due to the fact that an increase in the temperature in one portion of the system causes a corresponding increase in pressure, which is transmitted to all other portions of the system almost instantaneously while the increase in temperature of the moderator-coolant vapor lags because of inherent characteristics of the heat transfer phenomena. The pressure in that portion of the system remote from the disturbance, i.e. the reactor, thus would increase without a corresponding vapor temperature rise, thereby increasing the density of the moderator-coolant vapor and the reactivity of the reactor. However, by utilizing a surge chamber 54, a rapid change in the system pressure in one portion of the reactor system resulting from a sudden change in the vapor temperature is damped so that the change in pressure is reduced to the point where its effect is of little consequence. A temperature buffer chamber, which will be illustrated hereinbelow, is also provided in the reactor to dampen any sudden changes in the moderator-coolant vapor entering the reactor, thereby further promoting further reactor stability, if required.

It should be noted that in the system illustrated in FIG. 1 the moderator-coolant vapor pump 40 is, in the fluid flow sense, situated in the reactor system between the parallel connected superheater-reheater heat exchangers 34 and 36 and the boiler heat exchanger 46 to provide assurance that the moderator-coolant vapor can be maintained within the supercritical region in all portions of the system. Inasmuch as the lowest system pressure occurring in the reactor circuit occurs at the pump inlet, it would be undesirable to have, at this same point, the lowest system temperature. This would be the case if the pump were positioned between the boiler heat exchanger 46 and the reactor inlet 30, since such an arrangement might result in the moderator-coolant vapor dropping into the subcritical temperature and pressure range, with the possibility of condensation of the vapor and its attendant difficulties during large system transients. However, when greater system pressures are permissible the pump could be located between the final heat exchanger 46 and the reactor 22 (in FIG. 1) with a material reduction in system pumping power requirements as a result of the increased density of the moderator-coolant fluid at this point.

While only a closed cycle arrangement has been described herein, an open cycle of the Loeffler type may also be utilized as set forth in the above referenced copending application.

A specific embodiment of a preferred arrangement of a reactor of the present invention is illustrated in FIGURES 2 to 9 wherein the reactor comprises a pressure vessel 22, which consists of an elongated cylindrical shell portion 66 closed at the lower end by hemispherical head 68 having an outlet flange 70 integrally attached thereto.

The cylindrical shell 66 terminates at the upper end in a closure flange 72. An upper closure head 74 having a hemispherical head portion 76 and a closure flange 78 is adapted to close the upper end of the pressure vessel with the closure flange 78 of the head mating with the closure flange 72 of the pressure vessel and being secured thereto by a plurality of circumferentially spaced studs 80. An inlet nozzle 82 is disposed in the upper portion of the closure head 74 and is connected to inlet line 30 of the reactor system (in FIG. 1). The juncture of the closure head 74 with the closure flange 72 is provided with a pressure-tight seal 84 which may be of a semi-toroidal ring-type as is well known in the art. The cylindrical shell 66 of the pressure vessel may be provided with a plurality of external bands generally indicated as at 86 in order to more economically accommodate the comparatively high internal pressure, as is well known in the art.

The interior surface of the pressure vessel is provided with a layer 88 of thermal shielding material such as $CaH_2$ and steel or other thermal shielding material as is well known in the art. Such thermal shielding material extends through the height of the cylindrical portion 66 of the pressure vessel and extends along the inner surface of the lower head 68 to the inner circumference of flange 70. Additional thermal shielding material is provided at each end of the cylindrical section as will be disclosed later. A layer of neutron reflecting material 90 generally coextensive with the cylindrical shell portion 66, for instance graphite, abuts the inner surface of the thermal shielding material 88 and is supported by an annular support flange 92 secured to the inner surface of the pressure vessel.

Figure 2:
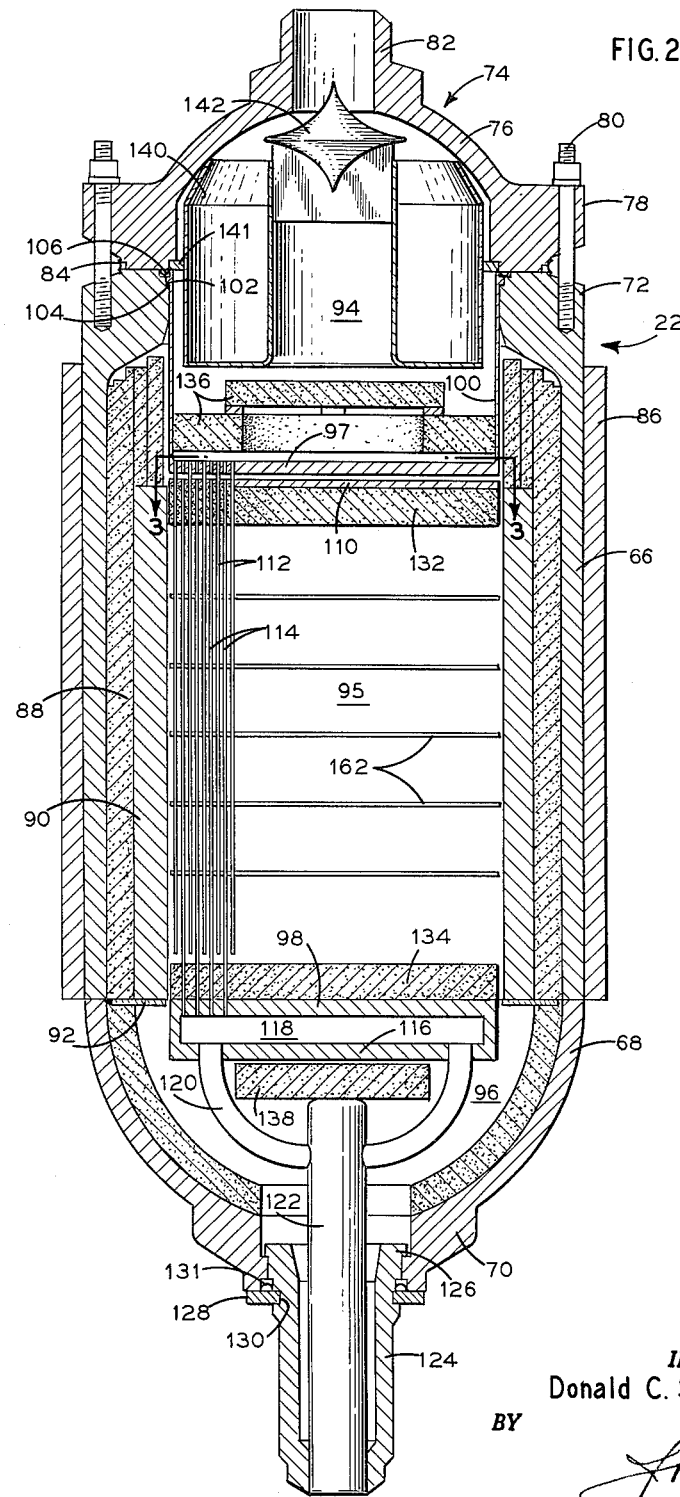
FIG. 2 is a vertical section of a specific arrangement of the reactor of the present invention.

As shown in FIG. 2, the interior of the reactor is divided into three vertically superimposed portions, the inlet plenum chamber 94, the central core region 95 and the outlet plenum chamber 96, the upper and lower tube sheets 97 and 98, respectively, serving to form the three zones. The upper or inlet plenum chamber 94 is formed within the upper portion of the pressure vessel by the upper tube sheet 97 which is supported by a cylindrical skirt member 100 from an outwardly extending flange member 102 supported within a circumscribing groove 104 formed in the upper closure flange 72 at its juncture with the closure head 74. A semi-toroidal sealing ring 106 is provided between the flange member 102 and the closure flange 72 preventing any leakage therebetween. A secondary upper tube sheet 110 (see FIG. 5) is supported and spaced from the upper tube sheet 97 by circumferentially disposed bolts 108 and spacers 109. A plurality of tubes 112 extend through both upper tube sheets 97 and 110 and through the central core region 95 of the reactor vessel. At their upper ends they are secured to the upper tube sheet 97 with a sliding fit within the secondary upper tube sheet 110. Additionally a plurality of tubes 114 terminate between the upper tube sheets 97 and 110, having a sliding fit through the secondary upper tube sheet, and extend through the core region 95 and through the lower tube sheet 98, to which they are secured. Alternatively tubes 114 may be secured to the secondary upper tube sheet 110 which is then supported only by bolts 108 so as to permit differential movement.

The lower tube sheet 98 cooperates with a U-shaped plate member 116 (see FIG. 2) to form a pressure-tight space designated as outlet header 118 which is connected by a plurality of connecting headers 120 to an inner outlet nozzle 122. The nozzle is positioned to extend vertically from below the outlet header 118 to an outlet nozzle 124. The outlet nozzle 124 is provided at its upper end with an outwardly extending flange member 126 which is adapted to seal against the inner surface of outlet flange 70. The lower end of outlet nozzle 124 is then connected to outlet line 32 (see FIG. 1). A split retaining ring 128 circumscribes the outer circumference of outlet nozzle 124 abutting the outer face of the outlet flange 70, and extending into groove 130 formed in the outer surface of the outlet nozzle 124. To rigidly secure the outlet nozzle against movement the ring 128 is attached to the outlet flange 70 by suitably spaced bolts (not shown). A semi-toroidal ring-type seal 131 is attached between the outlet nozzle 124 and the outlet flange 70 to provide a fluid-tight seal therebetween.

As illustrated, a layer of neutron reflecting material 132 is supported from the lower surface of the secondary upper tube sheet 110; a similar layer of neutron reflecting material 134 is supported on the upper surface of the lower tube sheet 98. These reflecting layers in conjunction with the wall reflecting material 90 provide the central core region 95 with complete encasement by the reflector material. Thermal shielding material is also provided at the ends of the central core region 95 to protect the ends of of the pressure vessel from excessive thermal heating effects. The upper thermal shielding material 136 is placed within the inlet plenum chamber 94 and comprises an annular portion spaced above and away from the upper tube sheet 97 together with a circular portion spaced above and away from the aforementioned annular portion to provide fluid flow area from the reactor inlet to the upper tube sheet. The lower thermal shielding material 138 is located in the space between the under side of the outlet header 118 and the upper end of the inner outlet nozzle 122.

A collection chamber 140 is supported in the inlet plenum chamber 94 by a circumferential flange 141 on the upper surface of flange member 102. The collection chamber has a generally annular shape being open at the top to the inlet plenum chamber 94 and closed at its lower extremity, the center of the annulus providing a flow passageway for the inlet moderator-coolant vapor from the inlet nozzle 82 to the upper tube sheet 97. An inlet flow baffle 142, having a double conical shape, is disposed concentric with the center of the condensate collection chamber and the inlet nozzle 82 to direct the incoming moderator-coolant vapor flow stream so that it does not flow directly through the central passage. The deflector baffle and the condensate collection chamber provide the temperature buffer chamber described above and minimize the amount of condensed moderator-coolant vapor flowing into the core region of the reactor when the reactor system is shut down.

While not shown, means may be provided for passing coolant fluid throughout the neutron reflecting material and the thermal shielding material during reactor operation to maintain these materials at the desired temperature.

Assembly of the internals of this reactor comprises the following steps. Prior to being placed within the reactor the tubes 112 are secured to tube sheet 97 and tubes 114 to tube sheet 98 with the tube sheet 110 suitably disposed. The lower tube sheet 98, the outlet header 118 and associated outlet nozzle 122 are supported from the upper tube sheet 97 by temporary suspension bolts (not shown) through the tubes 114. During assembly of the tubes 112 and 114 to their respective tube sheets, tube spacers 162 (later described) are installed, the upper and lower portions of the neutron reflecting material 132 and 134 are assembled and the lower portion 138 of the thermal shielding material is positioned. This entire assembly is then lowered into the reactor vessel and is suspended from the upper flange 72 by the circumferential flange 102 which is supported in the corresponding groove 104. The upper sealing ring 106 is then installed as is the lower sealing ring 131. The retainer ring 128 is then installed securing the outlet nozzle 124 to the outlet flange 70. It should be noted that this arrangement provides compensation for differential thermal expansion of the various parts of the reactor internals since the lower portion comprising tubes 114, outlet header 118 and the outlet nozzle 124, are rigidly secured only to the outlet flange 70. These components thus are free to expand upwardly with the tubes 114 moving through the secondary upper tube sheet 110. The upper tube sheet 97 and associated portion of the reactor internals are supported only at the upper extremity by flange member 102 through the instrumentality of groove 104 in flange 72, the tubes 112 being free to expand through the secondary upper tube sheet 110 since there is sufficient clearance provided to permit the relative motion. Clearance is also provided at the lower end of tubes 112, adjacent tube sheet 98 to accommodate this expansion.

After installation of the reactor internals the fuel elements are inserted and the upper thermal shielding material 136, the condensate collection chamber 140, and baffle 142 are positioned and the upper closure head 74 is attached to the pressure vessel.

In operation the moderator-coolant vapor enters the reactor through inlet nozzle 82, flows around the inlet flow baffle 142 and through the central passage provided in the collection chamber 140 around the upper thermal shielding material 136 to the inlet ends of tubes 112 in the upper tube sheet 97. The moderator-coolant vapor then flows through the tubes 112 discharging in the lowest portion of the central core region 95 adjacent the neutron reflecting material 134 and then flowing upward around the external surface of all the tubes 112 and 114, thence back to the space between the tube sheets 97 and 110 through appropriate passages in tube sheet 110 and reflector 132 (not shown) and thence into tubes 114. After flowing through tubes 114 the moderator-coolant vapor discharges into the outlet header 118 and on into outlet nozzle 124 via the connecting headers 120 and the inner outlet nozzle 122.

The tubular fuel elements of the reactor are suspended within tubes 112 and 114 with an annular space formed between the exterior surface of the fuel element and the inner surface of the respective tubes through which moderator-coolant vapor flows absorbing heat in direct heat transfer relationship with the fuel elements. The fuel elements within the tubes 112 comprise the first pass 24, discussed above with relation to FIG. 1, while the space about all of the tubes within the central core region 95 comprises the second or moderating pass 26, while the fuel elements within tubes 114 form the third pass 28.

Figure 5:
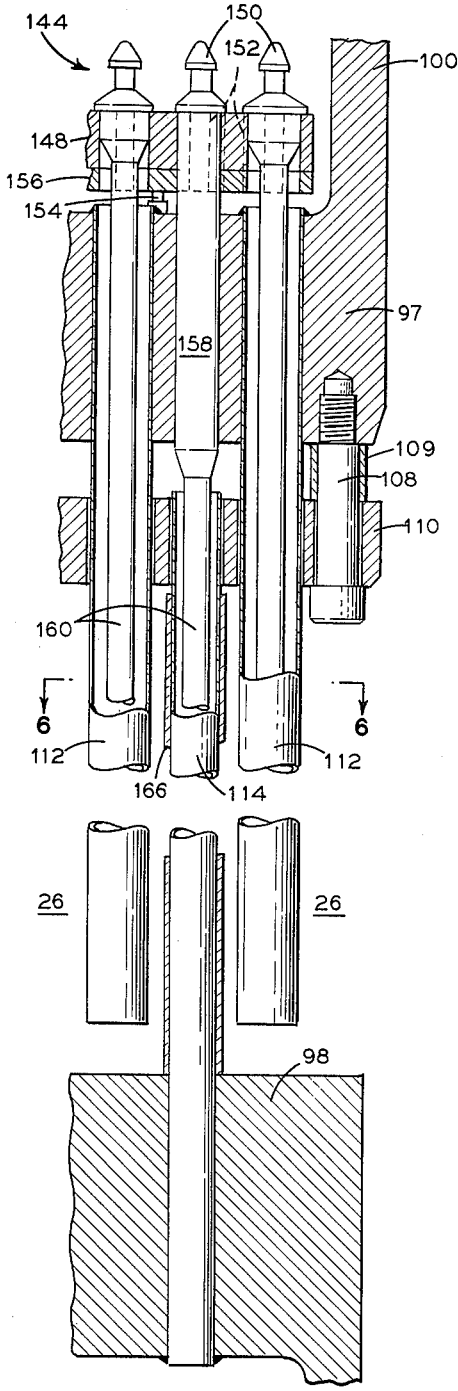
FIG. 5 is an enlarged view of a portion of the core of the reactor illustrated in FIG. 2.
Figure 3:
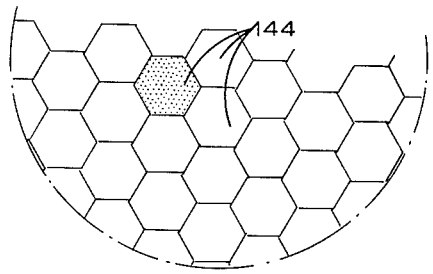
FIG. 3 is a portion of the cross-sectional view of the specific arrangement of the reactor in the present invention taken along lines 3—3 of FIG. 2.
Figure 4:
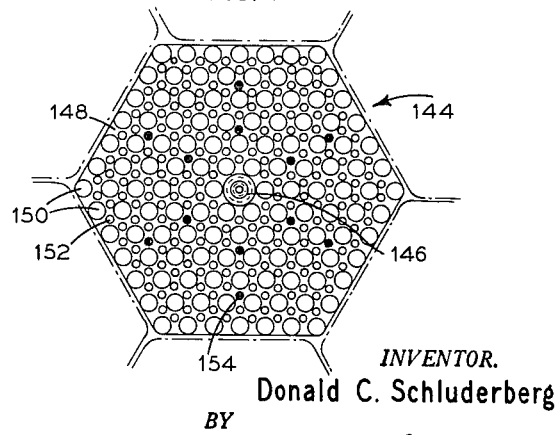
FIG. 4 is an enlarged plan view of a single fuel element bundle taken from the cross-sectional view of the reactor as shown in FIG. 3.

A portion of the cross-sectional view of the reactor showing a plan view of fuel element bundles 144 may be seen in FIG. 3. The fuel element bundles have a generally hexagonal cross section with fuel pins arranged in a triangular pitch throughout the cross section of the reactor core. FIG. 4 shows an enlarged plan view of a single fuel element bundle having a central handling knob 146 and a hexagonal fuel element tube sheet 148. Referring also to FIG. 5, it may be seen that the fuel element bundle tube sheet 148 is provided with a plurality of openings therethrough, through which the fuel pins 160 are suspended from enlarged end caps 150 into tubes 112 and 114. A plurality of smaller holes 152 are also provided through the fuel element tube sheet 144 for passage of the moderator-coolant vapor therethrough into tubes 112. A second fuel element bundle tube sheet 156 shown adjacent the fuel element tube bundle sheet 148 is free to move along the fuel pins so that upon removal of the fuel element bundle 144 from tubes 112 and 114 this second tube sheet 156 will become positioned at the lower end of the fuel element bundle thus providing spacing for the lower ends of the fuel pins 160. A plurality of spacers 154 are provided on the lower surface of the fuel element tube sheet 156 which space it and tube sheet 148 from the upper surface of tube sheet 97 thus permitting a flow area therebetween for the moderator-coolant vapor. It should be noted that the fuel pins suspended within tubes 114, which form the third pass of the reactor, are provided with an enlarged portion 158 at their upper extremity to prevent excessive leakage of moderator-coolant vapor from the upper plenum chamber directly into the third pass tubes 114.

Figure 6:
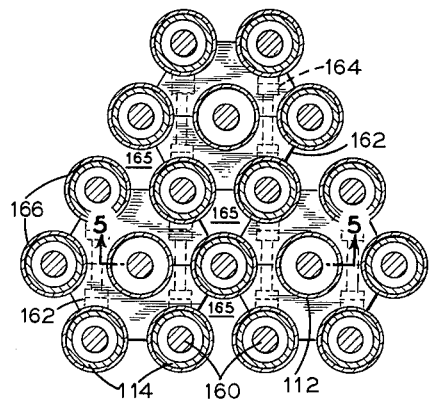
FIG. 6 is a cross-sectional view of a portion of a fuel element illustrating the first, second and third passes of the reactor and taken along line 6—6 of FIG. 5.

A cross-sectional view of a portion of the fuel elements in the central core region 95 is shown in FIG. 6, wherein it is seen that the fuel elements are divided between the third pass tubes 114 and first pass tubes 112 in a ratio of 3:1. It is also seen that a layer of insulation 166 is positioned around the outer surface of the third pass tubes 114, limiting the heat transfer between fuel elements therein and the moderator-coolant vapor in the moderating pass 26 so that the amount of moderation will be determined largely by the heat pickup of the moderator-coolant vapor in the first pass and permit only a very minor absorption of heat by the moderator-coolant vapor in the moderating pass. Also shown in FIG. 6 is one row of tube spacers 162 which are spaced throughout the height of the central core region 95, as seen in FIG. 2. Each spacer is comprised of two sections which are bolted together, as by bolts 164, around the first pass tubes 112 permitting tubes 114 to move independently therefrom. The spacers 162 are arranged so as to form flow passages 165, having approximately the same flow area as the annular flow passages of the first and third passes. Spacers 162 provide the tubes 112 and 114 with lateral bracing throughout their length while still providing for moderator-coolant vapor flow therethrough and around all of the tubes to moderate the chain reaction.

An enlarged detail of a fuel pin within a third pass tube 114 may be seen by referring to FIG. 7 wherein the fuel pin 160, containing a plurality of fissionable material-bearing pellets 167 as is well known in the art is disposed within a corrugated tubular member 170 and spaced therefrom by a plurality of spacing strips 168 extending longitudinally along the fuel pin and equally spaced therearound. The flow passage for the moderator-coolant vapor is thus the annular space between the fuel pin 160 and the corrugated tubular member 170. A layer of thermal insulating material such as stainless steel wool 174 is disposed about the outer surface of the corrugated tube member 170 and is encased by an outer covering 172. This thermal insulating material, as discussed above, reduces the heat transfer from the fuel pin of the third pass through the moderator-coolant vapor in the annular passage and the tube wall to the surrounding moderator-coolant vapor in the second moderating pass. While straight sided tubes may be used as shown in FIG. 5, the corrugation of the tubular member 170 permits the use of a relatively thin wall resulting in a conservation of neutrons, while at the same time providing satisfactory strength so that the tubular member may be self-supporting.

The fuel pin 160 of the first pass is shown in FIG. 8 and is similar to that of the third pass, being disposed within a corrugated tubular member 178 which forms tubes 112. The external surface of fuel pins 160 and both the first and third passes may be provided with surface roughening 180 to increase the heat transfer coefficient between the fuel pin and the moderator-coolant vapor.

A modified form of third pass tube arrangement is shown in FIG. 9 wherein the corrugated tubular member 170 is provided with insulation in the form of a plurality of layers of stainless steel foil 182 which is encased by the outer covering 184 having a plurality of grooves or dimples 186 formed therein for rigidity.

Table I sets forth details of the reactor described above:

TABLE I

| | |
|---|---|
| Reactor output | 750 mw. heat. |
| Net plant output | 321 mw. elec. |
| U–235 loading (initial/final)* | 1070.4/520.5 kg. |
| U–238 loading (initial/final)* | 22,632/22,221 kg. |
| Fuel enrichment (initial/final)* | 4.52/2.28%. |
| Average heat flux | 252,500 B.t.u./hr.-ft.$^2$. |
| Peak heat flux | 495,000 B.t.u./hr.-ft.$^2$. |
| Peak to average power ratio | 1.96. |

*Based upon 95% theoretical density UO$_2$.

TABLE I—Continued

Max. fuel clad surface temp.:
   1st pass _____ 750° F.
   3rd pass _____ 1140° F.
Specific power output _____ 0.31 Mwe./kg. U-235.
Core life _____ 775 days.
Average fuel burnup _____ 21,616 mwd./tonne $UO_2$.
Moderator-coolant fluid flow ____ $3.63 \times 10^6$ lb./hr.
$D_2O$ content in moderator-coolant vapor:
   At start of core life _____ 83%.
   At end of core life _____ 0%.
Core diameter (to outside of outermost fuel assemblies) _____ 105 in.
Total number of fuel pins _____ 5800.
Number of fuel pins in 1st pass __ 1450.
Number of fuel pins in 3rd pass __ 4350.
Pin pitch (triangular) _____ 1.30 in.
Active pin length _____ 12 ft.
Average fuel temperature _____ 2100° F.
Graphite reflector thickness _____ 17.5 in.
$CaH_2$ thermal shield thickness ___ 3.5 in.
1st pass assembly:
   Fuel tube O.D. _____ 0.5275 in.
   Shroud tube centerline diameter _____ 0.978 in.
3rd pass assembly:
   Fuel tube O.D. _____ 0.5275 in.
   Shroud tube centerline diameter _____ 0.717 in.
   Insulation foil equivalent thickness _____ 0.002 in.
   Insulation sleeve I.D. _____ 0.994 in.

*Core pass steam conditions*

|  | 1st pass | 2nd pass | 3rd pass |
|---|---|---|---|
| Inlet Steam Temp., F | 692 | 717 | 719 |
| Inlet Steam enthalpy, B.t.u./lb | 762.4 | 935.2 | 972.8 |
| Inlet Steam density, lb./ft.³ | 34.3 | 18.35 | 15.75 |
| Inlet Steam velocity, ft./sec | 8.10 | 3.53 | 17.65 |
| Inlet Steam Press., p.s.i.a | 3,430 | 3,400 | 3,400 |
| Outlet Steam Temp., F | 717 | 719 | 1,050 |
| Outlet Steam enthalpy, B.t.u./lb | 934.8 | 972.8 | 1,467.6 |
| Outlet Steam density, lb./ft.³ | 18.35 | 15.75 | 4.26 |
| Outlet Steam velocity, ft./sec | 15.15 | 4.10 | 65.30 |
| Outlet Steam Press., p.s.i.a | 3,400 | 3,400 | 3,300 |
| Heat Absorbed—mw. heat | 183.4 | 40.0 | 526.6 |

The superiority of the reactor of the present invention results from the advantages of using high pressure steam for cooling, moderation and control. The moderating power of supercritical steam permits development of compact reactor cores capable of considerably higher power output per unit of core volume within currently available pressure vessel sizes. Variation of moderator steam density during core life is advantageously used to achieve reactivity control thereby simplifying fabrication of the system. Furthermore, control rods may be replaced by a system of positive displacement pumps and relief valves with sensitivity amenable to close regulation, as described above, to produce controlled changes in reactivity simply by varying reactor system steam inventory and density. Maximum clad surface temperatures in this reactor are unusually low due to the absence of control rods and the flat radial power plus a skewed axial power profile in which the power peaks an appropriate amount in the cold end of the core. The amount of peaking is controlled by placing nonmoderating material, such as $ZrO_2$ or $Al_2O_3$, in the insulator space between tubes 114 and the outer covering 172. This, in combination with high reactor system efficiency and excellent coolant characteristics, permits a high power density, as set forth above, resulting in possible throw-away fuel cycle economics.

Figure 12:
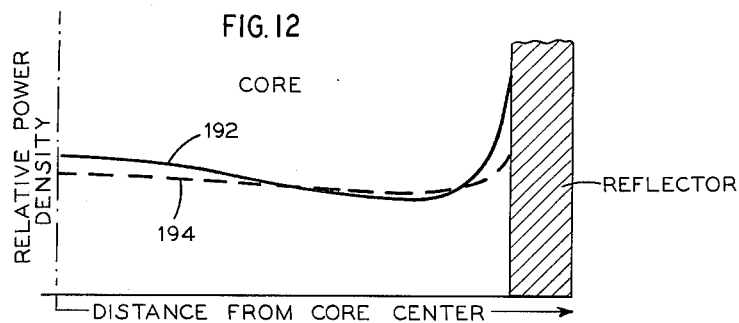
FIG. 12 is a graphical representation or relative power density across the reactor core cross section.

A further advantage of the present invention resides in the ability of the reactor to even out variations in the reactor neutron flux and power density level of the core. This occurs since any variation in radial power distribution of the core will produce a corresponding variation in moderator-coolant vapor density distribution since the amount of heat added to the moderator-coolant vapor in a specific zone of the reactor will determine the density of the moderator-coolant vapor in the same specific zone of the moderating space and thus regulate the power of the reactor in these zones. This flattening of power density is illustrated in FIG. 12 wherin trace line 192 illustrates the power distribution in a reactor having uniform moderating density and fuel enrichment throughout the core, while trace line 194 illustrates the relative power density of a reactor of the present invention.

Additional advantages of the present invention reside in the fact that the control of this reactor follows output load demands much more closely than do reactors of the prior art. This is due to the fact that upon a change in output load the returning moderator-coolant vapor entering the reactor quickly reflects the load change and immediately affects the reactivity of the reactor, while the reactors of the prior art are subject to several delay factors including the lag in signal time between sensing the change in the output load and the operation of the control rods. Another adverse effect common to reactors of the prior art, but which is significantly absent in a reactor of the present invention, is the fly-wheel effect of the coolant fluid which results in a lag in the speed of response to load change due to the time required to change the temperature of a large mass of coolant liquid in the reactor as compared to the sensitivity and speed of response characteristic of the vapor coolant of this invention. As a result of this fly-wheel effect, practical considerations have made it necessary for the control rods of the reactors of the prior art to be regulated to overcompensate for load changes so that the reactivity of the reactor tends to hunt until the final temperature and power level are achieved. Conversely, as a result of the low mass of the moderator-coolant vapor and its quick reaction to changes in output load, there is little change in the output temperature of the reactor resulting from output load changes.

Figure 13:
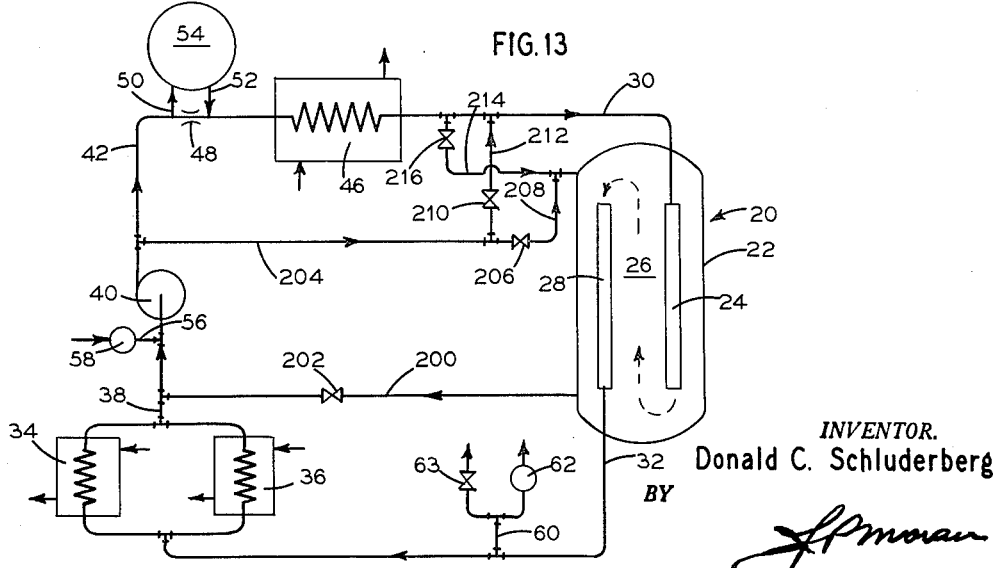
FIG. 13 is a schematic illustration of an alternate reactor system utilizing the present invention.

A variation in the reactor system illustrated in FIG. 1 is shown in FIG. 13 whereby wider output variation may be attained by circulating a larger quantity of moderator-coolant vapor through the first pass of the reactor while maintaining the original flow rate in the second and third passes. This is accomplished by extracting a portion of moderator-coolant vapor from the reactor at the end of the first pass via line 200 through valve 202 into the inlet line 38 of pump 40. In this way relative flow of moderator-coolant vapor through the first pass is increased, decreasing the heat pickup per pound of vapor and increasing the average density of the vapor throughout the reactor and thereby increasing reactivity and the power output. However, if by-pass line 200 is used alone, the reactor outlet temperature will decrease thus increasing the density within the core for the purpose of increasing power and prolonging core life.

If it should be desired to provide a more efficient reactor system by extracting a greater amount of heat in the boiler 46, lowering the moderator-coolant vapor temperature at the reactor inlet, it is necessary to increase the density of the moderator-coolant vapor in the second pass while maintaining the desired heat pickup within the reactor and keeping the outlet temperature of the reactor constant and would ordinarily result in a lower flow rate through the reactor. This causes difficulties in the sizing of the flow passages through the tubes around the fuel elements since the mass rate of flow of the moderator-coolant vapor determines the heat transfer characteristics and any variation in the flow rate would change the heat pickup of the vapor. However, with the arrangement shown in FIG. 13 it is possible to lower the density of the moderator-coolant in the second pass and yet maintain the flow rates in the first and third passes relatively constant while also maintaining the reactor outlet temperature substantially constant. This is accomplished by removing a portion of the moderator-coolant vapor from the end of the first pass via by-pass line 200 through valve 202 and inlet line 38 to pump 40 and introducing a corresponding amount of moderator vapor back into the reactor at the beginning of the third pass through by-pass line 204 through valve 206 and into the reactor via line 208. Since the extracted vapor is mixed with much hotter vapor leaving heat exchangers 34 and 36, the vapor reintroduced into the reactor via lines 204 and 208 is also at a higher temperature than would be the vapor flowing normally from the first pass resulting in a substantially constant reactor outlet temperature and outlet flow rate.

Conversely, should it be desirable to decrease the amount of heat extracted from the moderator-coolant vapor by heat exchangers 34, 36, and 46, while maintaining the flow rates and the reactor outlet temperature substantially constant, it would be necessary to decrease the density of the moderator-coolant vapor in the second pass. To accomplish this, a portion of the moderator-coolant vapor is extracted from the reactor at the end of the first pass via by-pass line 200 and is reintroduced into the first pass of the reactor via line 204 through valve 210 and line 212 resulting in a somewhat higher inlet temperature to the reactor. In order to keep the outlet temperature from rising, a portion of cooler moderator vapor is introduced at the beginning of the third pass from the outlet of the heat exchanger 46 via by-pass line 214 through valve 216, thus maintaining the flow through the reactor within satisfactory limits and the reactor outlet temperature constant. Accordingly, the present invention may be arranged for very flexible operation with wide ranges of output obtainable while maintaining satisfactory flow rates and a substantially constant outlet temperature.

Many variations present themselves when the various types of moderator-coolant vapors are considered, the only limitations placed upon these fluids being that they have desirable heat transfer characteristics and that they be compatible for use with structural materials available at the temperatures and pressures contemplated. It is necessary, of course, that the moderator-coolant vapor contain a sufficient quantity of hydrogen atoms, either in a free state or in combination, to provide the necessary amount of neutron moderation at practical working temperatures and pressures. Further, it is necessary that the moderator-coolant vapor be in a vaporous state at the working temperatures and pressures in order to provide the requisite variation in fluid density. This requirement for vaporized moderator-coolant vapor is also necessary in order to make the requisite safety "scram" obtainable merely by venting the reactor circuit to a lower pressure through a quick opening relief valve.

In line with the above, it may readily be seen that hydrocarbon vapors can be used as the moderator-coolant vapor. While the operating pressures of a hydrocarbon moderator-coolant vapor would generally be lower than those required using steam moderation, the basic theory and mode of operation would still be the same. Additionally, the use of hydrocarbon vapors would make possible the adoption of neutron irradiation in the refining and production of petroleum products or other chemical compounds. For example, acetylene or benzene vapor could be used as the moderator-coolant vapor while undergoing changes to higher polymer hydrocarbons by means of chemonuclear reactions.

A further modification of the present invention envisions the use of only fissionable material-bearing fuel elements in the reactor core. Such a reactor would be one in which neutron economy is of only secondary interest, the primary objective being a reactor having a high power output from a relatively small and compact size. In this adaptation the variation in the moderator density would change only the amount of neutron leakage out of the reactor core to variably control the fission-type chain reaction.

An additional modification is realized when the method of control of the reactor herein described is combined with the prior art method of moderation, namely, the use of a static, built-in type of moderator, such as graphite or zirconium-hydride. Such an arrangement would be similar to the graphite-moderated, gas-cooled reactors, well known in the art, except that the moderation provided by the graphite would not be permitted to be sufficient to make the reactor core critical. The final amount of moderation necessary to make the reactor critical would be supplied by the hydrogen-bearing moderator-coolant vapor described above. In this way it would still be possible to variably control, and even to shutdown the chain reaction by varying the density of the moderating vapor.

Additionally, the present invention may be utilized in a reactor having a central core region arranged to undergo fission reactions as a result of fast neutrons generated by the fission process. Such a fast core region would be surrounded by a thermal blanket region which, in turn, is surrounded by a neutron reflector. While a fast core region has no requirement of neutron moderation, it is controlled by the variation of neutron moderation within the thermal blanket region. This is due to the fact that the amount of neutrons being reflected into the fast core region will be determined by the number of neutrons slowed by moderation in the thermal region and entering into thermal fission reactions. Such neutron moderation as taught by the present invention results in higher neutron efficiencies for use in such a fast-thermal core than would be the case should other prior art moderating methods be used.

While in accordance with the provisions of the statutes, the best forms and modes of operation of the invention now known have been illustrated, those skilled in the art will understand that changes may be made in the form of the apparatus without departing from the spirit of the invention covered by the claims, and that certain features of the invention may sometimes be used to advantage without a corresponding use of other features.

What is claimed is:

1. A heterogeneous nuclear reactor comprising a pressure vessel divided into a plurality of passes for the flow of a fluid therethrough, a multiplicity of fissionable material-bearing fuel elements arranged in a fixed lattice as a core in a first and a third pass of said reactor, said core arranged to undergo a fission-type chain reaction, means for passing a single phase hydrogen-bearing moderating and cooling vapor through a first pass in direct heat transfer contact with said fuel elements therein to cool said elements and heat said vapor to a predetermined range of moderating density, means for passing said vapor through a second pass about all of said fuel elements in said first and third passes to moderate said chain reaction, means for passing said heated vapor through said third pass in direct heat transfer contact with said fuel elements therein, said first pass fuel elements being arranged to reflect changes in reactivity of said reactor by changing the amount of heat imparted to said vapor in contact therewith to regulate the density of said vapor entering said second pass to vary the reactivity of said reactor, and means for varying the density of said vapor in said core to regulate the chain reaction throughout the life of said fuel elements.

2. A heterogeneous nuclear reactor comprising a pressure vessel divided into a plurality of serially arranged passes arranged for the flow of a fluid therethrough, a multiplicity of fissionable material-bearing fuel elements arranged in a fixed lattice as a core in a first and a third pass of said reactor, said core arranged to undergo a fission-type chain reaction, means for passing steam as a single phase hydrogen-bearing moderating and cooling vapor through said first pass in direct heat transfer contact with said fuel elements therein to cool said elements and heat said steam to a predetermined range of moderating density, means for passing said steam through a second pass in indirect heat transfer contact with all of said fuel elements to moderate said chain reaction, and means for passing said heated steam through said third pass in direct heat transfer contact with said fuel elements therein to further heat said steam, said first pass fuel elements being arranged to reflect changes in reactivity of said reactor by changing the amount of heat imparted to said steam in contact therewith to regulate the density of said steam entering said second pass to vary the reactivity of said reactor.

3. A heterogeneous nuclear reactor comprising a pressure vessel divided into a plurality of serially arranged passes arranged for the flow of a fluid therethrough, a multiplicity of fissionable material-bearing fuel elements arranged in a fixed lattice as a core in a first and a third pass of said reactor, said core arranged to undergo a fission-type chain reaction, means for passing steam as a single phase hydrogen-bearing moderating and cooling vapor through said first pass in direct heat transfer contact with said fuel elements therein to cool said elements and heat said steam to a predetermined range of moderating density, means for passing said steam through a second pass in indirect heat transfer contact with all of said fuel elements to moderate said chain reaction, means for passing said heated steam through said third pass in direct heat transfer contact with said fuel elements therein to further heat said steam, said first pass fuel elements being arranged to reflect changes in reactivity of said reactor by changing the amount of heat imparted to said steam in direct heat transfer contact therewith to regulate the density of said steam entering said second pass to vary the reactivity of said reactor, and means for varying the concentration of vaporous hydrogen in said core to regulate said chain reaction throughout the life of said fuel elements.

4. A method of controlling, moderating, and cooling a heterogeneous nuclear reactor having a multiplicity of fissionable material-bearing fuel elements arranged in a fixed lattice as a core to undergo a fission-type chain reaction, said core having a plurality of fixed regular flow channels therethrough, comprising the steps of introducing $H_2O$ and $D_2O$ bearing supercritical steam as a moderating and cooling vapor in direct heat transfer contact with one group of said fuel elements to cool said elements and heat said steam to a predetermined range of moderating density, then passing said steam at said moderating density in indirect heat transfer contact with all of said fuel elements in said core to moderate said chain reaction then passing said heated steam in direct heat transfer contact with the remaining group of said fuel elements to be further heated, allowing the amount of moderation of said chain reaction to be automatically regulated by the heat imparted to said moderating and cooling steam by said first group of fuel elements, and regulating said chain reaction throughout the life of said fuel elements by varying the density of said steam in said reactor and by varying the proportion of $H_2O$ and $D_2O$ in said steam.

5. A heterogeneous nuclear reactor comprising a pressure vessel divided into a plurality of serially arranged passes arranged for the flow of a fluid therethrough, a multiplicity of fissionable material-bearing fuel elements arranged in a fixed lattice as a core in a first and a third pass of said reactor, said core arranged to undergo a fission-type chain reaction, means including a closed circuit adapted to pass $H_2O$ and $D_2O$ bearing supercritical steam as a moderating and cooling vapor through said first pass in direct heat transfer contact with said fuel elements therein to cool said elements and heat said steam to a predetermined range of moderating density, means for passing said steam through a second pass in indirect heat transfer contact with all of said fuel elements to moderate said chain reaction, means for passing said heated steam through said third pass in direct heat transfer contact with said fuel elements therein to further heat said steam, said first pass fuel elements arranged to reflect changes in reactivity of said reactor by changing the amount of heat imparted to said steam in direct heat transfer contact therewith to regulate the density of said steam entering said second pass to vary the reactivity of said reactor, means for varying the proportion of $H_2O$ and $D_2O$ in said steam and for varying the density of said steam in said core to regulate said chain reaction throughout the life of said fuel elements.

6. A method of controlling, moderating, and cooling a heterogeneous nuclear reactor having a multiplicity of fissionable material-bearing fuel elements arranged in a fixed lattice therein as a core to undergo a fission-type chain reaction, said core being arranged to have a positive coolant density coefficient of reactivity, said core having a plurality of fixed regular flow channels therethrough, said flow channels being arranged in a plurality of serially arranged passes for the flow of a moderator-coolant vapor therethrough, said fuel elements being arranged in at least one of said passes, comprising the steps of circulating a single phase hydrogen-bearing moderating and cooling vapor through said reactor while maintaining said vapor in a single phase throughout said core, passing said moderating and cooling vapor through a first pass over said fuel elements therein to cool said elements and heat said vapor to a predetermined range of moderating density, predominately moderating said chain reaction by passing said vapor at said moderating density through a second pass, and allowing the amount of moderation of said chain reaction to be automatically regulated by the heat imparted to said vapor by said fuel elements in said first pass.

7. The method of operating a heterogeneous nuclear reactor according to claim 6 wherein the chain reaction is regulated throughout the life of said fuel elements by controllably varying the density of said vapor in said reactor to vary the concentration of hydrogen in said core.

8. The method of operating a heterogeneous nuclear reactor according to claim 6 wherein the chain reaction is regulated throughout the life of said fuel elements by controllably varying the concentration of hydrogen in said vapor.

9. The method of operating a heterogeneous nuclear reactor according to claim 6 wherein the vapor in the first pass is in direct heat transfer contact with the fuel elements therein and the vapor in the second pass is in indirect heat transfer contact with the fuel elements.

10. A heterogeneous nuclear reactor comprising a pressure vessel divided into a plurality of serially arranged passes arranged for the flow of a fluid therethrough, a multiplicity of fissionable material-bearing fuel elements arranged in a fixed lattice as a core in a first pass of said reactor, said core being arranged to undergo a fission-type chain reaction, means for passing a single phase hydrogen-bearing moderating and cooling vapor through said first pass in direct heat transfer contact with said fuel elements therein to cool said elements and heat said vapor to a predetermined range of moderating density, and means for passing said vapor through a second pass in indirect heat transfer contact with said fuel elements to moderate said chain reaction, said first pass fuel elements being arranged to reflect changes in reactivity of said reactor by changing the amount of heat imparted to said vapor in contact therewith to regulate the density of said vapor entering said second pass to vary the reactivity of said reactor.

11. A method of controlling, moderating, and cooling a heterogeneous nuclear reactor having a multiplicity of fissionable material-bearing fuel elements arranged in a fixed lattice as a core to undergo a fission-type chain reaction, said core being arranged to have a positive coolant density coefficient of reactivity, said core having a plurality of fixed regular flow channels therethrough, comprising the steps of introducing single phase steam in direct heat transfer contact with one group of said fuel elements to cool said elements and heat said steam to a predetermined range of moderating density, then passing said steam at said moderating density in indirect heat transfer contact with all of said fuel elements in said core to moderate said chain reaction, then passing said heated steam in direct heat transfer contact with the remaining group of said fuel elements to be further heated, allowing the amount of moderation of said chain reaction to be automatically regulated by the heat imparted to the moderating and cooling steam by the first group of said fuel elements, and regulating said chain reaction throughout the life of said fuel elements by varying the concentration of hydrogen in said steam and by varying the density of said steam in said reactor.

12. The method of operating a heterogeneous nuclear reactor according to claim 11 wherein said steam is in the supercritical state.

References Cited by the Examiner

FOREIGN PATENTS

| | | |
|---|---|---|
| 1,273,431 | 9/1961 | France. |
| 1,079,753 | 4/1960 | Germany. |
| 749,064 | 5/1956 | Great Britain. |

OTHER REFERENCES

HW-59684, "Supercritical Pressure Power Reactor," Mar. 18, 1959, pages 1–37.

CARL D. QUARFORTH, *Primary Examiner.*

REUBEN EPSTEIN, *Examiner.*